United States Patent [19]

Szegda

[11] Patent Number: 4,892,275
[45] Date of Patent: Jan. 9, 1990

[54] TRAP BRACKET ASSEMBLY

[75] Inventor: Andrew Szegda, Canastota, N.Y.

[73] Assignee: John Mezzalingua Assoc. Inc., Manlius, N.Y.

[21] Appl. No.: 265,028

[22] Filed: Oct. 31, 1988

[51] Int. Cl.⁴ .......................................... E21F 17/02
[52] U.S. Cl. ..................................... 248/61; 248/68.1
[58] Field of Search ........................ 248/61, 63, 68.1; 174/157, 41

[56] References Cited

U.S. PATENT DOCUMENTS

| | | | |
|---|---|---|---|
| 1,945,488 | 1/1934 | Lavarack et al. | 248/61 X |
| 2,252,820 | 8/1941 | Tallman | 248/61 |
| 3,023,989 | 3/1962 | White | 174/157 |
| 3,055,398 | 9/1962 | Tunnessen | 248/61 |
| 3,055,623 | 9/1962 | Becker | 248/61 |
| 3,173,638 | 3/1965 | Neale, Sr. | 248/61 |
| 4,131,257 | 12/1978 | Sterling | 248/68.1 |
| 4,255,609 | 3/1981 | Charlebois et al. | 174/41 |
| 4,397,435 | 8/1983 | Fisher et al. | 248/61 |
| 4,570,884 | 2/1986 | Armbruster | 248/68.1 |
| 4,647,715 | 3/1987 | Butler | 174/41 |

FOREIGN PATENT DOCUMENTS 544618  4/1942  United Kingdom ................ 174/157

Primary Examiner—J. Franklin Foss
Attorney, Agent, or Firm—Samuels, Gauthier, Stevens & Kehoe

[57] ABSTRACT

A trap bracket assembly for use in a cable television system, wherein multiple trap shields are held in a mutually fixed parallel relationship and suspended from a support cable carrying the coaxial cable.

8 Claims, 2 Drawing Sheets

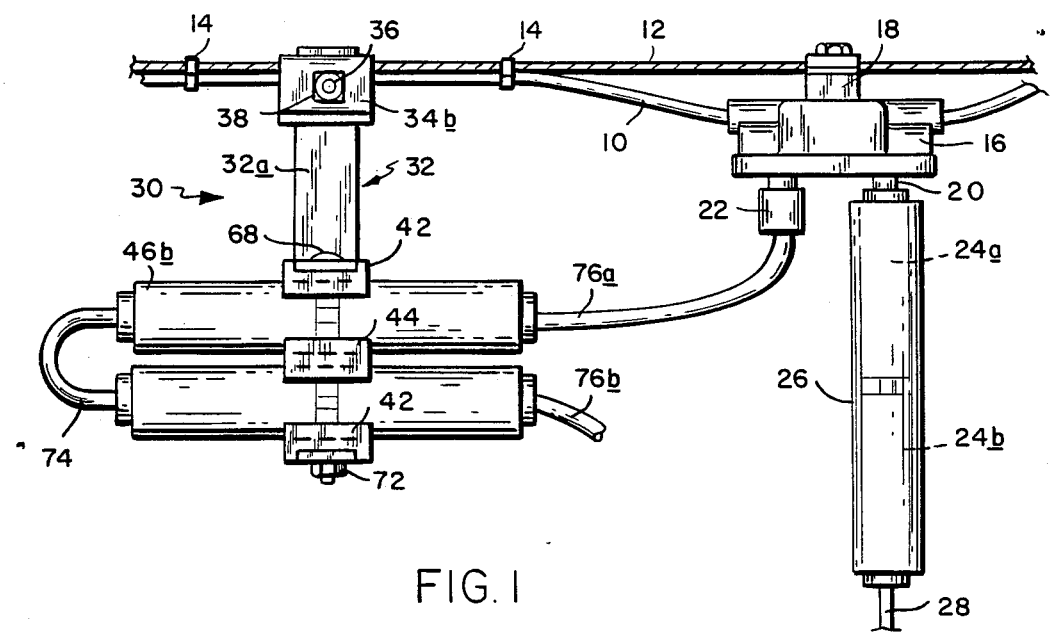
FIG. 1
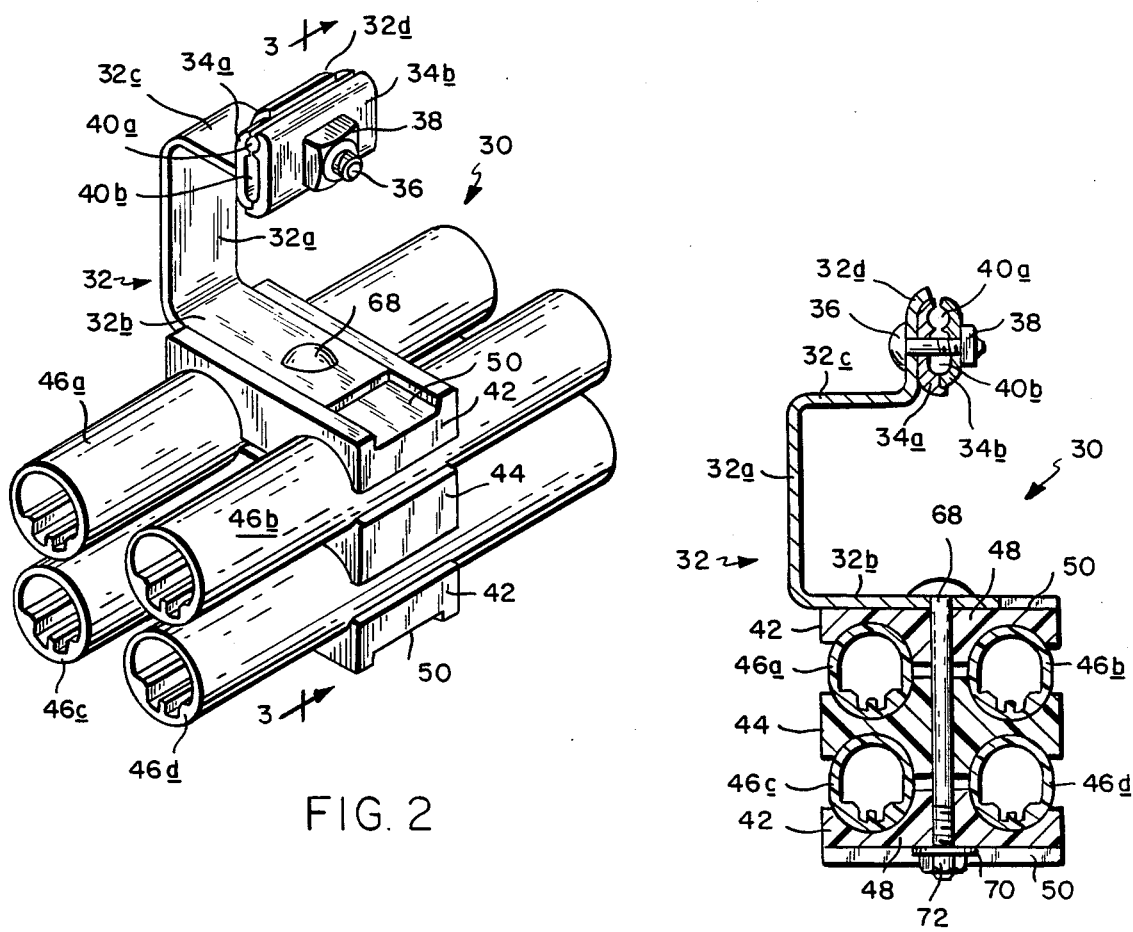
FIG. 2
FIG. 3

TRAP BRACKET ASSEMBLY

BACKGROUND OF THE INVENTION

1. Field of the Invention

This invention relates generally to cable television systems, and is concerned in particular with an improved bracket assembly for supporting traps used to filter out scrambling signals.

2. Description of the Prior Art

In cable television systems, various premium or "pay" channels are offered to subscribers. In some systems, such channels may have video signal filtered out, by a "trap," for a non-subscriber. In other systems, scrambling signals are filtered out by a specially adapted "trap" to allow a subscriber to view that channel. The traps are normally retained in tamper-proof protective shields and are installed in series in the drop line leading from the tap in the main coaxial cable to the subscriber's receiver.

Conventionally, the traps are mounted directly to a spigot or "port" on the tap housing. Where, as is often the case, multiple traps are arranged in series, their combined weight (including that of the protective shields) can produce stresses which ultimately cause failures of the port connections. This situation is further aggravated by the elements, particularly where high winds and ice deposits are encountered.

Attempts have been made at enclosing the traps in protective boxes, but such boxes have been found to be costly, and the enclosed traps cannot be monitored visually from ground level.

SUMMARY OF THE INVENTION

The present invention is directed to the provision of a bracket assembly for supporting multiple traps and their protective shields at a convenient location directly proximate to the tap. The bracket assembly includes a hanger bracket which is suspended from the support cable carrying the coaxial cable. Mutually spaced clamp blocks are separately joined to the hanger bracket. The clamp blocks have confronting sides between which the protective trap shields are held in parallel alignment.

Preferably, the protective trap shields are transparent, and the clamp blocks also are molded of a transparent material. This allows the traps to be inspected from ground level, thus simplifying maintenance procedures.

The multiple traps are connected in series, with the first trap of the series being connected to the tap port by a short segment of the drop line. This effectively avoids the imposition of damaging stresses on the tap port, thereby further minimizing maintenance problems.

These and other objects and advantages of the present invention will become more apparent as the description proceeds with the aid of the accompanying drawings, wherein:

BRIEF DESCRIPTION OF THE DRAWINGS

FIG. 1 is a side elevational view of a typical tap connection in a cable television system, showing both the conventional arrangement of multiple traps suspended directly from the tap port, and an arrangement in accordance with the present invention, where a bracket assembly is employed to support multiple traps;

FIG. 2 is a perspective view of one embodiment of a trap bracket assembly of the present invention, as illustrated in FIG. 1, but without traps contained in the protective shields;

FIG. 3 is a sectional view taken along line 3—3 of FIG. 2;

DETAILED DESCRIPTION OF ILLUSTRATED EMBODIMENTS

Figure 4:
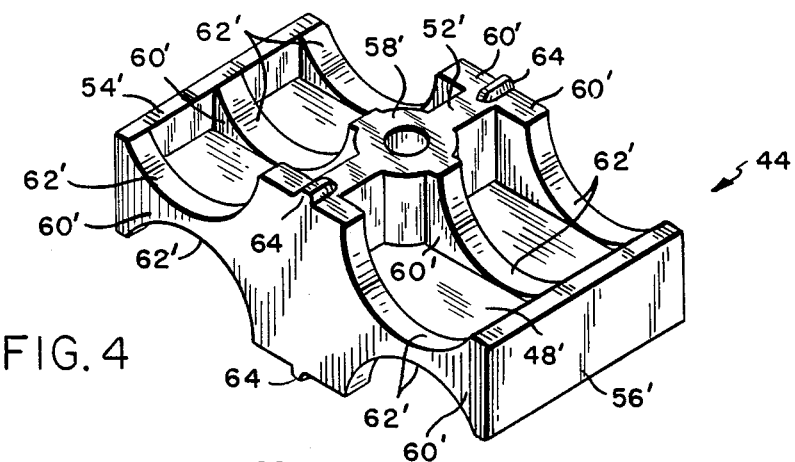
FIG. 4 is a perspective view of an intermediate clamp block.
Figure 5:
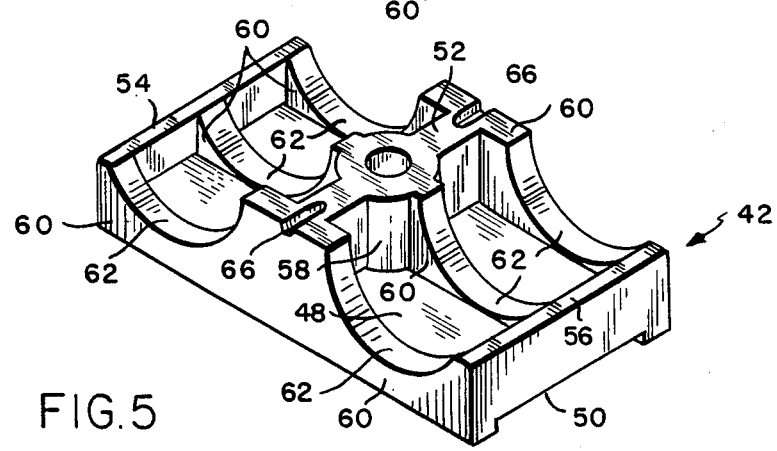
FIG. 5 is a perspective view of an exterior clamp block which can serve either as a top or bottom block of the assembly.

Referring initially to FIG. 1, a cable television system coaxial cable 10 is shown extending coextensively with a support cable 12. Conventional clamps 14 secure the cables together at spaced locations along the lengths thereof, with the result that the coaxial cable is carried by the support cable.

A conventional tap 16 is shown interrupting the continuity of the coaxial cable 10. The tap is supported from the support cable 12 by means of a bracket 18. The tap 16 has multiple ports, two of which are illustrated at 20, 22, from which signals carried by the coaxial cable 10 can be tapped off for use by cable subscribers.

On the right-hand side of FIG. 1, a conventional multi-trap arrangement is shown for filtering out scrambling signals. Here, several traps 24a, 24b are connected in series within a tamper-proof protective shield 26. The upper most or first trap 24a is connected directly to the port 20, and the lowermost or last trap 24b is connected to a drop line 28 leading to the subscriber's receiver (not shown).

With this conventional arrangement, the combined weight of the traps 24a, 24b and their shield 26 places undue stress on the port 20. This situation is aggravated by high winds, ice deposits, etc., with the result that the port 20 is often damaged, causing an interruption in signal reception, and necessitating costly repairs which must frequently be performed under adverse weather conditions.

With reference to the left-hand side of FIG. 1 as well as to FIGS. 2-5, the present invention offers a solution to the above-described problems by providing a bracket assembly generally indicated at 30. The bracket assembly includes a hanger bracket 32 having a vertical segment 32a cooperating with a horizontal segment 32b to define a somewhat L-shaped configuration. The vertical segment 32a has an upper horizontal flange 32c terminating at an upturned flange 32d. A first connector means comprises confronting jaws 34a, 34b interconnected to each other and to the upturned flange 32d by means of the combination of a threaded fastener 36 and nut 38. The jaws 34a, 34b define a pair of vertically disposed recesses 40a, 40b. The support cable 12 is tightly clamped between the jaws 34a, 34b in the upper recess 40a, with the coaxial cable 10 being loosely confined within the lower recess 40b.

Mutually inverted outer clamp blocks 42 coact with one or more intermediate clamp blocks 44 to grip and retain a plurality of protective trap shields 46a, 46b, 46c and 46d in parallel alignment. The clamp blocks 42, 44 are integrally molded, preferably of a transparent material. Each outer clamp block 42 has a base wall 48, the exterior surface of which is interrupted by a channel-shaped groove 50. As can best be seen in FIG. 5, a central wall 52 and parallel side walls 54, 56 protrude inwardly from the base wall 48. An apertured boss 58 is formed centrally in the central wall 52, and contoured webs 60 having concave inner edges 62 extend between the central wall 52 and each of the side walls 54, 56. The contoured inner edges 62 define open-sided notche configured and dimensioned to partially surround the trap shields.

Each intermediate clamp block 44 has a base wall 48,, the opposite surfaces of which are provided with central walls 52', side walls 54', 56', apertured bosses 58', and contoured webs 60' with concave inner edges 62', all shaped and arranged as described previously in connection with the outer clamp blocks 42.

The central walls 52, of the intermediate blocks 44 are further provided with tongues 64 designed to fit within grooves 66 in the central walls 52 of the outer blocks 42, thereby serving to align the blocks in a vertically stacked arrangement.

As shown in FIGS. 1-3, the uppermost trap shields 46*l*, 46*b* are retained between an uppermost outer block 42 and the upper side of an intermediate block 44, whereas the lowermost trap shields 46*c*, 46*d* are retained between the underside of intermediate block 44 and an underlying inverted outer block 42. The contoured edges 62 serve as locating means for aligning the trap shields gripped therebetween in a parallel arrangement.

A second connector means comprising a threaded fastener 68, washer 70 and nut 72 is employed to hold the bracket assembly together. The fastener extends through a hole in the lower bracket segment 32*b*, and through the aligned apertured bosses 58, 58'. The lower bracket segment 32*b* fits within the groove 50, and by tightening the nut 72, the entire assembly is rigidly fixed together.

This arrangement makes it possible to employ differentlength trap shields, if so desired, and to accommodate any number of shields by simply increasing the number of intermediate blocks. As shown in FIG. 1, multiple traps can be connected in series in each shield, with the traps in one shield being series-connected to the traps in another shield by short wire segments 74. The first trap in the series is connected to a tap port 22 by a drop line segment 76*a*, and the last trap in the series is likewise connected by another drop line segment 76*b* to a subscriber's receiver (not shown). The entire combined weight of the traps, shields and bracket assembly components is carried by the support cable 12, leaving the tap port 22 virtually stress-free. Thus, exposure of the trap assembly to the elements is not likely to damage the port 22.

Figure 6:
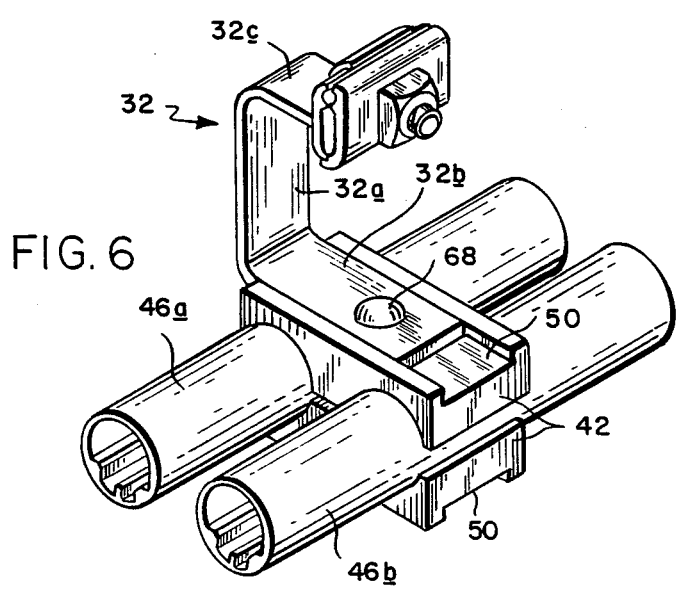
FIG. 6 is a perspective view of an alternate embodiment of a trap bracket assembly in accordance with the present invention.

FIG. 6 illustrates a slightly modified embodiment, where only two trap shields 46*a*, 46*b* are held between a pair of mutually inverted outer blocks 42.

I claim:

1. For use in a cable television system having a coaxial cable extending coextensively with and supported by a support cable, with the coaxial cable being adapted to carry a plurality of television signals which are scrambled by scrambling signals injected therein, the continuity of the coaxial cable being interrupted by at least one tap from which the scrambled television signals may be directed via a drop line to subscriber's receiver, with filter traps contained in protective shields and connected in series in the drop line between the tap and the subscriber's receiver to filter out the scrambling signals, the improvement comprising: a trap bracket assembly for supporting said shields and the traps contained therein at a location proximate to said trap, said bracket assembly including:

(a) a hanger bracket having a vertical segment, a lower segment extending horizontally from said vertical segment to define an L-shaped configuration, and an upper segment extending horizontally from said vertical segment to overlie said lower segment;

(b) first connector means associated with said upper segment for detachably securing said hanger bracket to the support cable;

(c) a plurality of vertically stacked clamp blocks underlying said lower segment, said clamp blocks having complimentary confronting sides configured to grip said shields therebetween and to maintain said shields in a mutually spaced parallel arrangement; and (d) second connector means for separably interconnecting said clamp blocks to each other and to said lower segment.

2. The trap bracket assembly of claim 1 wherein said hanger bracket is additionally provided with a flanee extending vertically from said upper segment, and wherein said first connector means comprises confronting jaw members interconnected to each other and to said flange.

3. The trap bracket assembly of claim 2 wherein said confronting jaw members have complimentary surfaces defining a pair of vertically disposed recesses, one of said recesses being configured to tightly grip said support cable and the other of said, recesses being configured to loosely confine said coaxial cable.

4. The trap bracket assembly of claim 1 wherein the uppermost of said vertically stacked clamp blocks is provided with an exterior groove, and wherein said lower segment is received in said groove.

5. The trap bracket assembly of claim 1 wherein said second connector means includes a threaded connector element extending vertically through said clamp blocks and said lower segment.

6. The trap bracket assembly of claim 5 wherein said threaded connector is aligned vertically with said first connector means.

7. The trap bracket assembly of claim 1 wherein said complimentary confronting sides are provided with central walls, side walls parallel to said central walls, and mutually spaced webs extending laterally from said central walls to said side walls, said webs having contoured edges defining open sided notches configured and dimensioned to partially surround said trap shields.

8. The trap bracket assembly of claim 7 wherein said central walls have apertured bosses, and wherein said second connector means extends through said bosses.

* * * * *